United States Patent
Brown

(10) Patent No.: US 6,788,753 B1
(45) Date of Patent: Sep. 7, 2004

(54) MAINTENANCE OF DATA SYNCHRONIZATION ACROSS LARGE GAPS IN A DATA STREAM

(75) Inventor: Christopher T. Brown, Sunnyvale, CA (US)

(73) Assignee: Oak Technology, Inc., Santa Clara, CA (US)

( * ) Notice: Subject to any disclaimer, the term of this patent is extended or adjusted under 35 U.S.C. 154(b) by 0 days.

(21) Appl. No.: 09/570,371

(22) Filed: May 12, 2000

(51) Int. Cl.[7] .................................................. H04L 7/00
(52) U.S. Cl. ................................................. 375/368
(58) Field of Search ............................... 375/368, 357, 375/365, 142, 149, 145; 370/509, 512, 514

(56) References Cited

U.S. PATENT DOCUMENTS 5,524,127 A * 6/1996 Petranovich ................. 375/368
6,104,770 A * 8/2000 Yama ......................... 375/368

* cited by examiner

Primary Examiner—Stephen Chin
Assistant Examiner—Kevin Kim
(74) Attorney, Agent, or Firm—Parsons Hsue & de Runtz LLP

(57) ABSTRACT

A timing circuit used in reading disc media or other dada includes multiple sync detection circuits. In the event that an active sync detection circuit fails to detect sync signals within predefined parameters, a different one of the sync detection circuits searches for a sync pattern. Uniquely definable sequences of sync patterns are used to determine a position of sync patterns within a sector of data.

40 Claims, 12 Drawing Sheets

DVD SYNC TYPES

| Sync type | Pattern |
|---|---|
| SYNC0:0 | 0001_0010_0100_0100_0000_0000_0001_0001 |
| SYNC0:1 | 0001_0010_0000_0100_0000_0000_0001_0001 |
| SYNC0:2 | 1001_0010_0000_0100_0000_0000_0001_0001 |
| SYNC0:3 | 1001_0010_0100_0100_0000_0000_0001_0001 |
| SYNC1:0 | 0000_0100_0000_0100_0000_0000_0001_0001 |
| SYNC1:1 | 0000_0100_0000_0100_0000_0000_0001_0001 |
| SYNC1:2 | 1000_0100_0100_0100_0000_0000_0001_0001 |
| SYNC1:3 | 1000_0100_0000_0100_0000_0000_0001_0001 |
| SYNC2:0 | 0001_0000_0000_0100_0000_0000_0001_0001 |
| SYNC2:1 | 0001_0000_0100_0100_0000_0000_0001_0001 |
| SYNC2:2 | 1001_0000_0100_0100_0000_0000_0001_0001 |
| SYNC2:3 | 1001_0000_0000_0100_0000_0000_0001_0001 |
| SYNC3:0 | 0000_1000_0000_0100_0000_0000_0001_0001 |
| SYNC3:1 | 0000_1000_0100_0100_0000_0000_0001_0001 |
| SYNC3:2 | 1000_0010_0100_0100_0000_0000_0001_0001 |
| SYNC3:3 | 1000_0010_0000_0100_0000_0000_0001_0001 |

Fig. 3A

DVD SYNC TYPES

| Sync type | Pattern |
| --- | --- |
| SYNC4:0 | 0010_0000_0000_0100_0000_0000_0001_0001 |
| SYNC4:1 | 0001_0000_0100_0100_0000_0000_0001_0001 |
| SYNC4:2 | 1000_1000_0100_0100_0000_0000_0001_0001 |
| SYNC4:3 | 1000_1000_0000_0100_0000_0000_0001_0001 |
| SYNC5:0 | 0010_0010_0100_0100_0000_0000_0001_0001 |
| SYNC5:1 | 0010_0010_0000_0100_0000_0000_0001_0001 |
| SYNC5:2 | 1000_1001_0000_0100_0000_0000_0001_0001 |
| SYNC5:3 | 1000_0001_0000_0100_0000_0000_0001_0001 |
| SYNC6:0 | 0010_0100_1000_0100_0000_0000_0001_0001 |
| SYNC6:1 | 0010_0000_1000_0100_0000_0000_0001_0001 |
| SYNC6:2 | 1001_0000_1000_0100_0000_0000_0001_0001 |
| SYNC6:3 | 1000_0000_0100_0100_0000_0000_0001_0001 |
| SYNC7:0 | 0010_0100_0100_0100_0000_0000_0001_0001 |
| SYNC7:1 | 0010_0100_0000_0100_0000_0000_0001_0001 |
| SYNC7:2 | 1000_1000_1000_0100_0000_0000_0001_0001 |
| SYNC7:3 | 1000_0000_1000_0100_0000_0000_0001_0001 |

*Fig. 3B*

| SYNC TYPE | PATTERN 91 16-bit |
|---|---|
| CD SYNC | 1000_0000_0001_0000_0000_0010 |

*Fig. 4*

| ROW | SYNC TYPE 32 bits | DATA 91 16-bit data symbols | SYNC TYPE 32 bits | DATA 91 16-bit data symbols |
|---|---|---|---|---|
| 0 | SYNC0 | DATA | SYNC5 | DATA |
| 1 | SYNC1 | DATA | SYNC5 | DATA |
| 2 | SYNC2 | DATA | SYNC5 | DATA |
| 3 | SYNC3 | DATA | SYNC5 | DATA |
| 4 | SYNC4 | DATA | SYNC5 | DATA |
| 5 | SYNC1 | DATA | SYNC6 | DATA |
| 6 | SYNC2 | DATA | SYNC6 | DATA |
| 7 | SYNC3 | DATA | SYNC6 | DATA |
| 8 | SYNC4 | DATA | SYNC6 | DATA |
| 9 | SYNC1 | DATA | SYNC7 | DATA |
| 10 | SYNC2 | DATA | SYNC7 | DATA |
| 11 | SYNC3 | DATA | SYNC7 | DATA |
| 12 | SYNC4 | DATA | SYNC7 | DATA |

*Fig. 5*

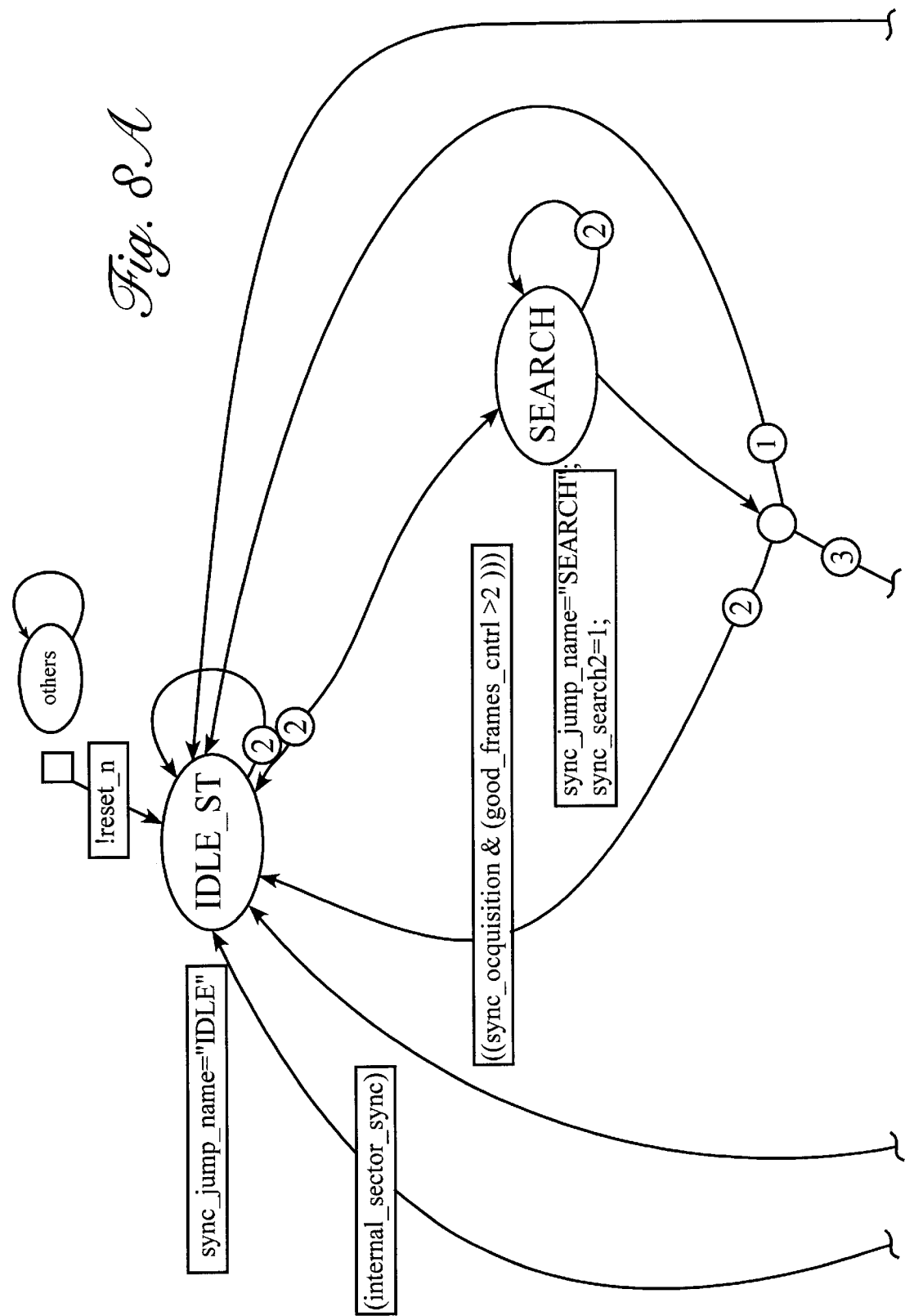

MAINTENANCE OF DATA SYNCHRONIZATION ACROSS LARGE GAPS IN A DATA STREAM

FIELD OF THE INVENTION

This invention concerns data processing. More particularly the invention concerns detection of sync patterns such as those used for reading media such as CD and DVD discs.

BACKGROUND OF THE INVENTION

A digital data stream from an optical storage device contains a unique binary pattern that appears at a predetermined interval within the digital bit stream. This pattern is called a sync pattern. Sync patterns are used on various forms of digital media, including CD (compact disc) and DVD formats. CD formats include CD-ROM, CD-audio, CD-R (CD write once) and CD-RW. The ability to detect the sync pattern within the serial bit stream is required in order to recover the original data encoded on the storage media. The problem is that there may be dirt or other foreign material such as fingerprints, organic or inorganic substances. Additionally, there may be scratches on the media or defects stamped in the media during manufacturing that alter the data that is read. The presence of such interfering alterations can damage the sync pattern and/or cause the sync pattern to appear earlier or later than expected within the bit stream. If the sync pattern cannot be detected, data synchronization may be temporarily lost, resulting in elevated data error rates prior to data demodulation and correction.

Sync detect circuits typically use one or two state machines for detecting and maintaining data synchronization. In typical implementations, a sync window is used when looking for the sync pattern. Once a valid sync pattern is found, the sync detect logic will not begin looking for the next sync pattern until the start of the sync window. This method prevents the sync detect logic from triggering on false sync patterns that may appear within the data stream due to corrupted data. The sync window is typical 2N+1 bits wide, centered around the ideal distance from the last sync found. If the sync pattern appears N bits too soon or N bits too late, it will still be detected and the data following the sync pattern can be demodulated correctly.

If the data from the media is very corrupted or the read channel is poorly designed, the sync pattern will be shifted too far away from the ideal, fall outside the sync window, and be missed. For large defects, the shift can be very large (100 or more bits). This prevents the normal sync window method from ever seeing the sync after the defect, resulting in unreadable data.

This invention allows data to be read from a disc even if there are large shifts or jumps from sync to sync that could be caused by a large defect. This allows data to be read which would otherwise been unrecoverable.

In the prior art, it is known to use a narrow sync window and use the first sync found in a CD-DSP implementation. Typically, the narrow sync window is less than +/−14 bits. Such implementations did not provide for large jumps in sync position that would allow data to be read correctly.

SUMMARY OF THE INVENTION

According to the present invention, a determination of a requirement for a sync jump is recognized when a detected sync position deviates from an expected position by a predetermined amount. If the requirement exists, a different state machine is used to detect a new sync pattern. When such a requirement for a sync jump is detected, a determination is made as to which direction a sync jump should be effected. After the determination is made, the jump is effected.

According to one aspect of the invention, the determination is made for a data stream which utilizes sync signals. According to a specific embodiment of the present invention, the determination is made when reading disc media, which in a particular embodiment is disc media which in some instances conforms to the DVD format. According to a preferred embodiment of the invention, the determination is made for disc media which conforms to the DVD format and may also for disc media which conforms to the CD format. Specifically, according to that preferred embodiment of the invention, the DVD format conformed to includes 1488 data bits per frame and the CD format includes 588 data bits per frame.

According to one particular embodiment of the present invention, the direction of the jump is made by determining a direction which results in the smallest jump. According to an alternate embodiment of the present invention, an internal time base or clock is used to measure a read clock (RCLK) speed before a jump when the sync pattern is within the window. A second read clock speed measurement is made as a search for a new sync sequence. The direction of the jump is determined by comparing the two measurements. If the jump is effected in a forward direction, a pointer is moved accordingly and the new sync pattern is adopted. According to one embodiment of the invention, if the jump is determined to be performed as a backwards jump, a pointer is moved accordingly. According to an alternate embodiment of the invention, if the jump is determined to be performed as a backwards jump, data is temporarily stopped from being sent downstream for demodulation. When the new data point is equal to a corresponding point in the old data prior to the jump, data is allowed to be sent downstream for demodulation.

"Pointer" is intended to refer to a reference location in a data stream which indicates position within a sync frame.

According to the present invention, a sync detect circuit uses an additional state machine and other logic to handle sync detection when there are large jumps or gaps in the data stream typically caused by defects. A master state machine, the Sync Control State Machine, is used to perform the initial search for sync patterns and sync sequences and to maintain synchronization once it has been established. The second state machine, the Sync Jump State Machine, is responsible for handling any cases where a defect causes a large jump in the sync sequence, i.e., the sync patterns begin to fall outside of the sync window.

The Sync Control state machine starts in an Idle state. When read channel data enters the system, Sync Control enters the Sync Sequence Validation state. This state used to verify that the sync patterns have the expected spacing between them. For a bit stream from DVD media, this state is also used to determine if the sync patterns are in the expected numerical order. Once sync validation is complete, Sync Control transitions to the next state. For DVD media, this would be the ECC Block Validation state where the start of an ECC block is determined. The ECC Block Validation state is skipped for CD media. The last Sync Control state is called Data Acquisition. In this state the sync detect engine is able to identify the sync patterns and transfer this information, along with the actual bit stream, to the demodulator.

At this point, the second state machine, Sync Jump, begins to monitor the sync error rate. If an exact sync pattern cannot be found within the sync window during Data Acquisition state, it could be an example of a small bit error or an indication that a defect has caused the sync patterns to begin falling outside of the sync window. The former case will correct itself when the next (good) sync pattern is detected. In the later case however, synchronization will never be re-established on its own. The sync patterns would continue to fall outside the sync window and data would be unrecoverable. In a typical system today, the Sync Control state machine would drop out of sync lock and start the sync search process over again. This would cause the data to be unreadable. The gap in data could be ignored or an attempt to re-read (re-seek) could be made. With the Sync Jump state machine in place, Sync Control can continue to output data and sync to the demodulator. At the same time, the Sync Jump state machine begins looking for a new sync sequence using a similar process that Sync Control used. If Sync Jump can quickly find and validate a sync sequence outside the current sync window, the sync window can be moved to the new location (i.e., a sync jump takes place) without affecting the readability of the after error correction.

A problem occurs when moving the sync window position. The demodulator or error correction logic beyond the sync detection logic must be informed that a sync jump is taking place. Sync detection must determine the direction of the sync jump too. During the defect, it is possible that the clock to data relationship caused a jump forward in time or backward in time. This direction and the new location must be passed on to the other logic in the system for the seamless data recovery to be possible. A jump forward in time causes a small loss of data that will have to be replaced at error correction time. A jump backward can be handled in two different methods: a) inform the other logic that a backward jump has occurred and the data for the current area will be repeated; b) temporarily stop sending data to the other logic until the data in the incoming bit stream has caught up to the point within the data that has already been transmitted to the other logic.

BRIEF DESCRIPTION OF THE DRAWINGS

FIG. 2A is a schematic block diagram showing circuit connections of the sync detect block, and FIGS. 2B–D show connection details of the schematic block diagram;

FIGS. 3A and B are a table showing sync signal data for a DVD format used with the present invention;

FIG. 4 is a table showing sync signal data for a CD format used with the present invention;

FIG. 5 is a table showing a sequence of sync sequences used with the present invention.

DETAILED DESCRIPTION OF THE INVENTION

Figure 1:
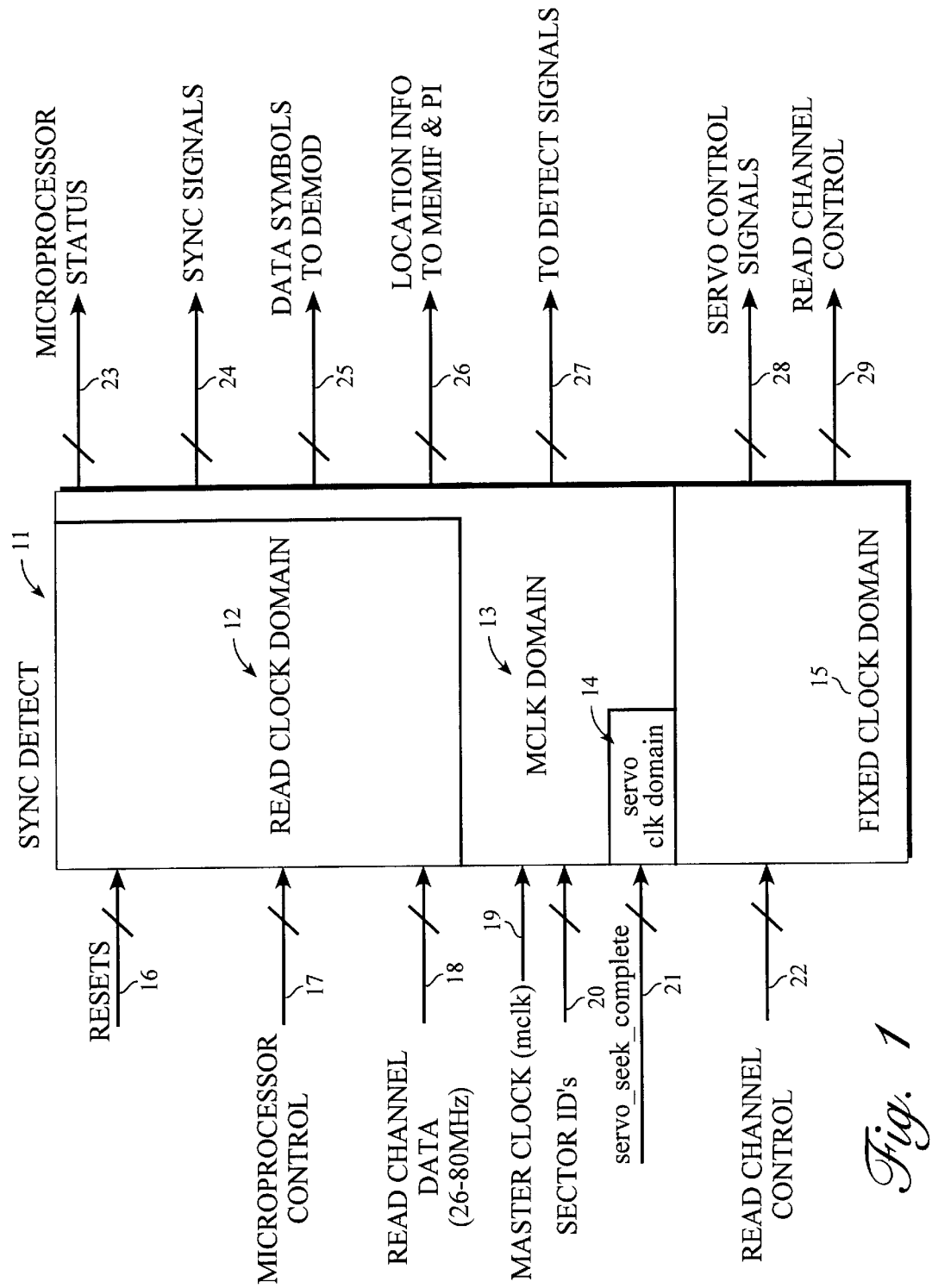
FIG. 1 is a schematic block diagram showing a sync detect block, with input/output signals.
Figure 2A:
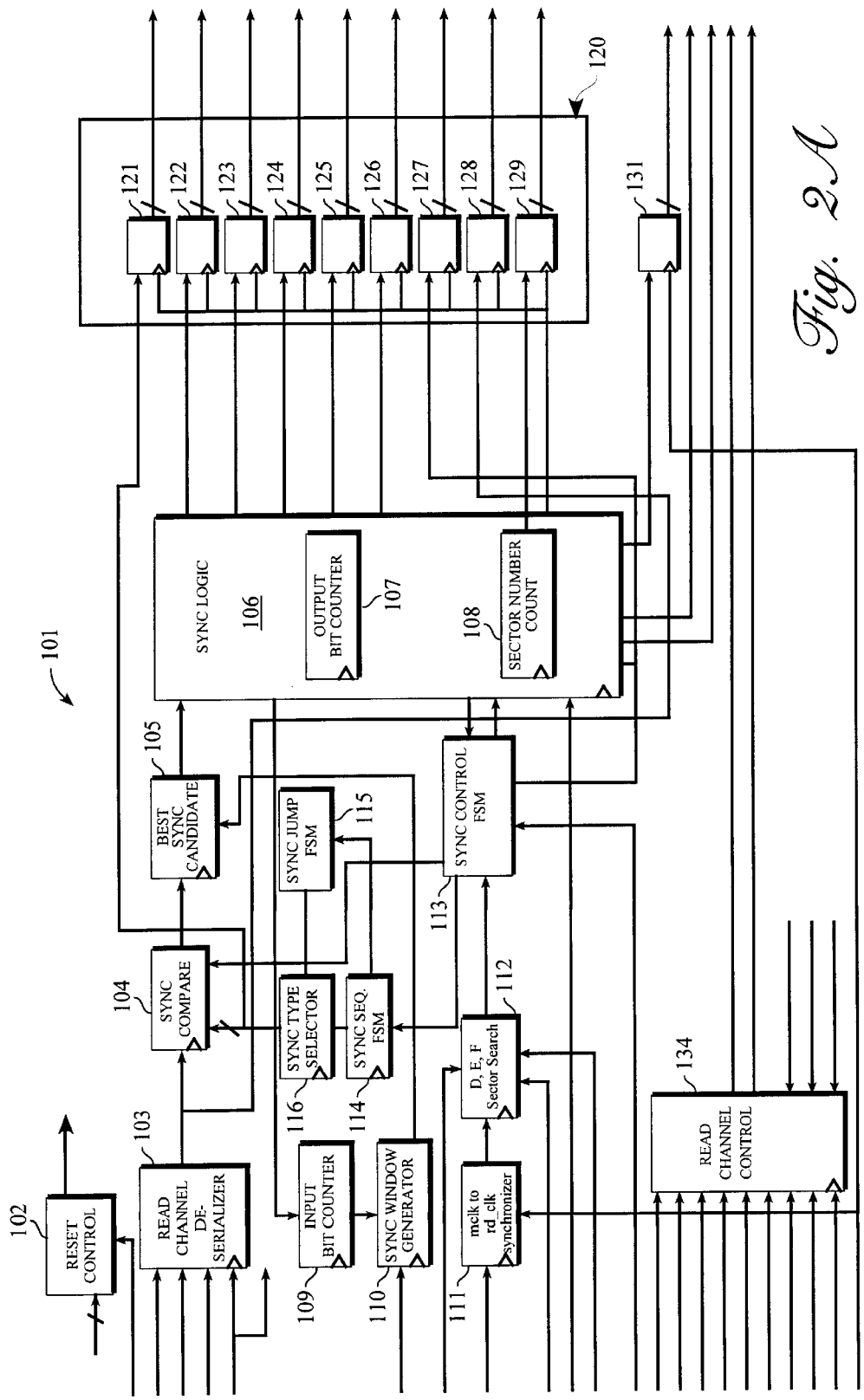
FIGS. 2A–D are schematic block diagrams showing details of the sync detect block of FIG. 1.
Figure 2B:
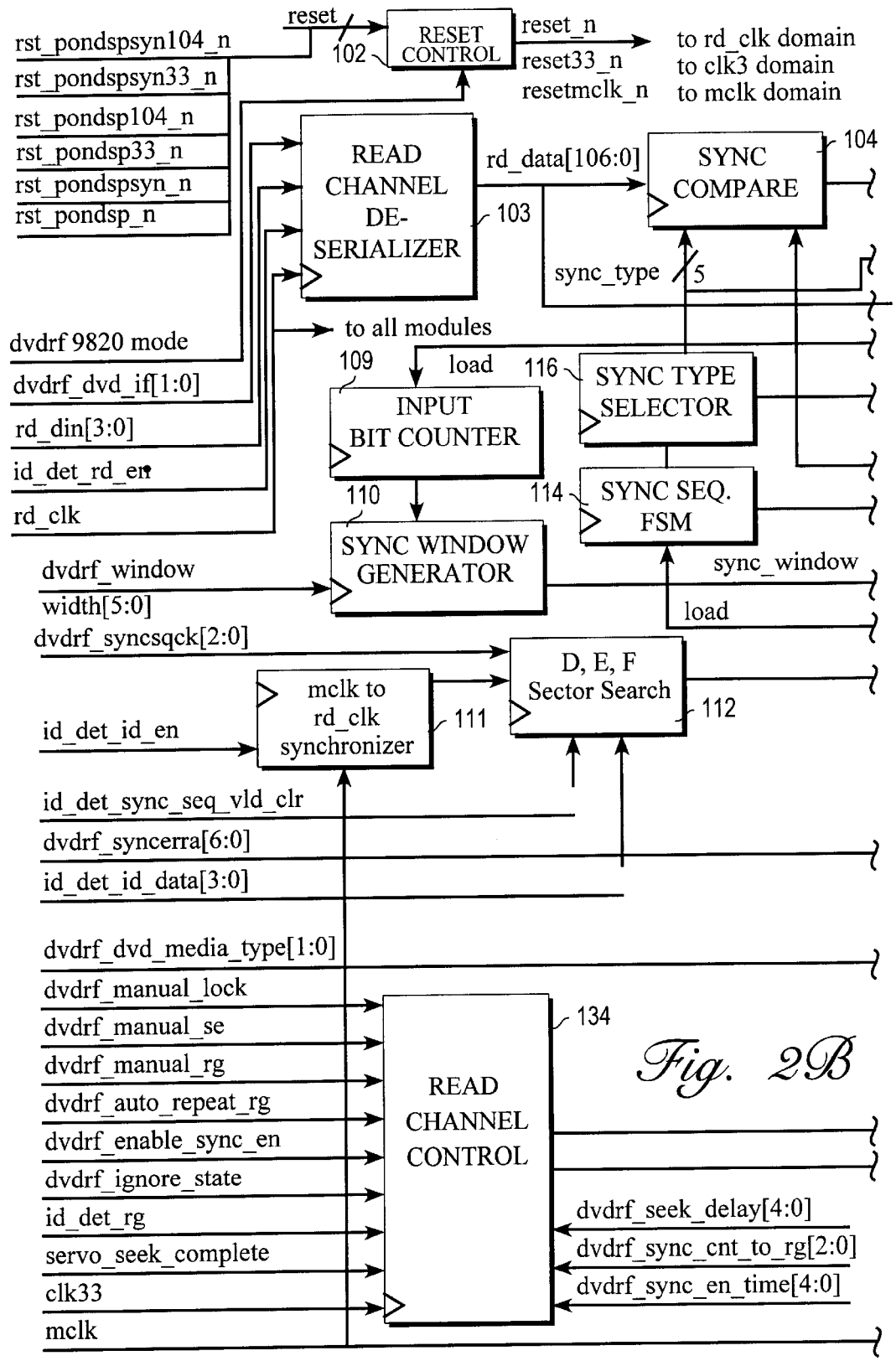
Figure 2C:
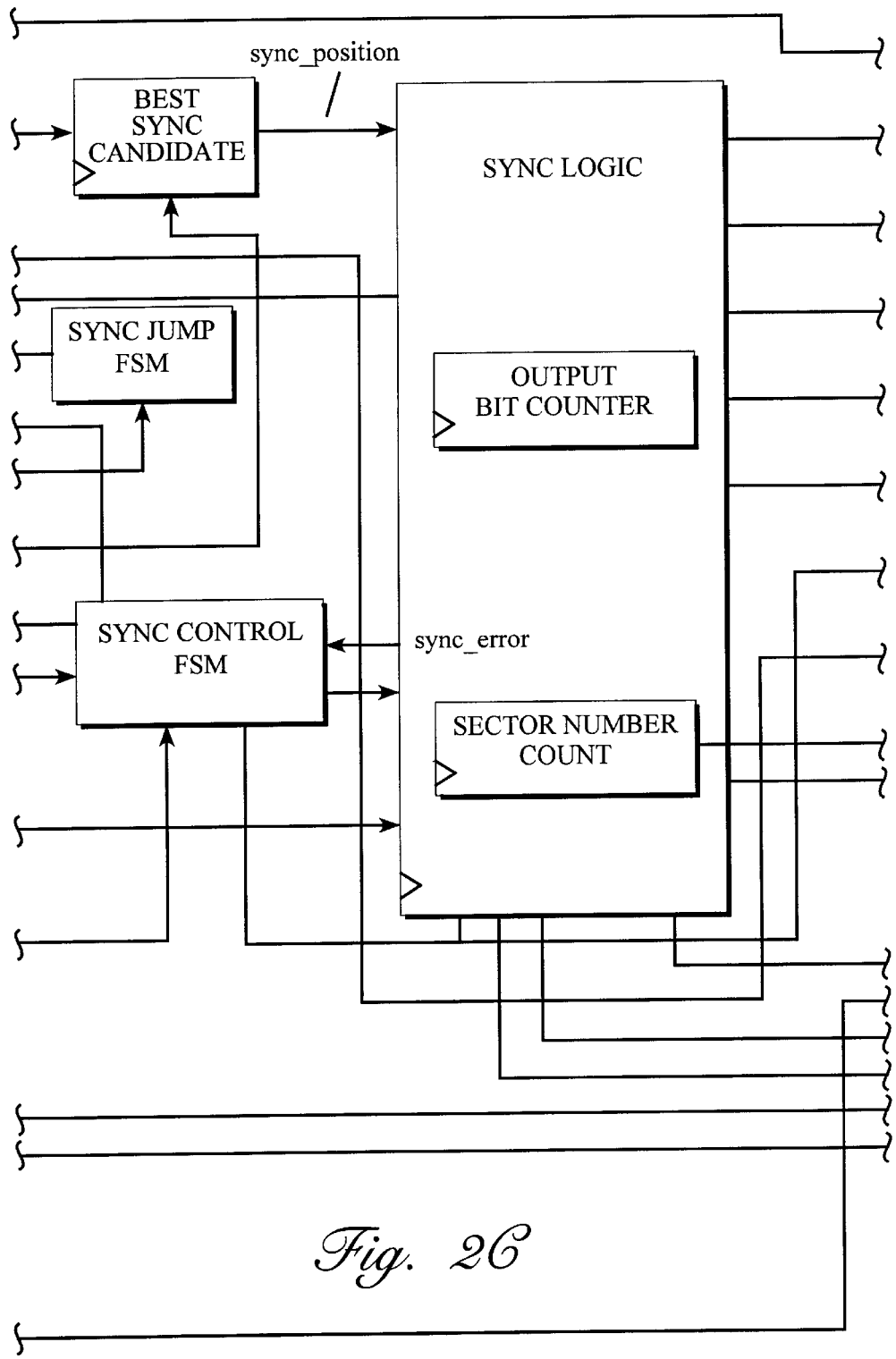
Figure 2D:
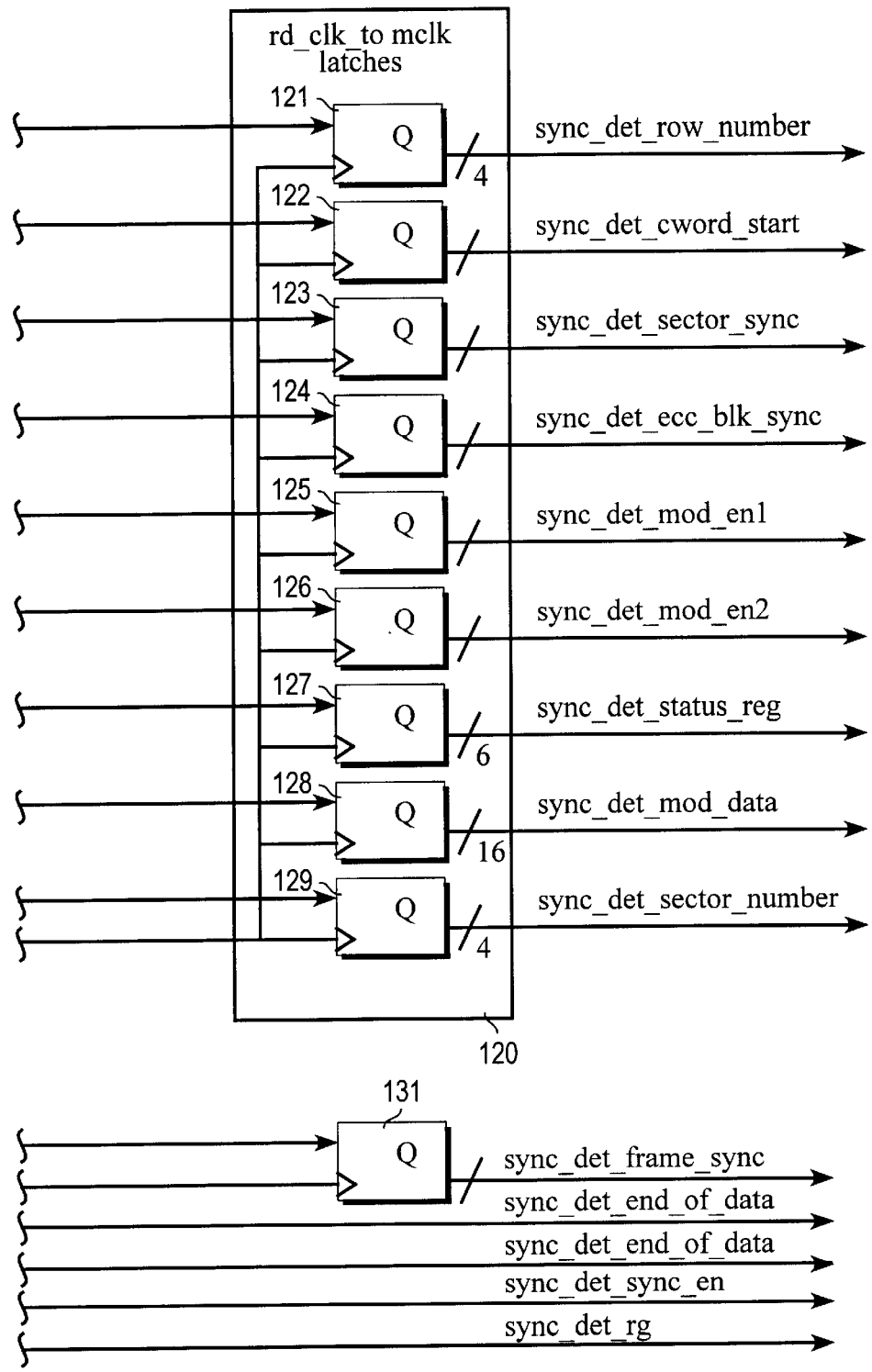

FIG. 1 is a schematic block diagram showing a sync detect block, with input/output signals. Referring to FIG. 1, a sync detect block 11 includes a read block domain 12, a master clock (MCLK) domain 13, a servo clock domain 14, and a fixed clock or CLK33 domain 15. The sync detect block 11 receives reset signals 16, microprocessor control signals 17 and read channel data 18. The read channel data 18 includes clock signals which, according to the present embodiment, range from 26 to 80 MHz. The MCLK domain 13 receives maxter clock (MCLK) signals 19 and sector ID data 20. The Fixed clock domain 15 receives read channel control signals 22. The MCLK domain 13 provides output signals which include microprocessor status signals 23, sync signals 24, data signals for demodulation 25, location information 26, and ID detect signals 27. Fixed clock domain 15 provides servo control signals 28 and read channel control signals 29. The MCLK domain 13 is generally fixed for any one implementation. The MCLK domain 13 receives sector ID's 26 and provides sync detection data. The fixed clock domain 15 is a fixed rate block that cannot be changed by the user. Anything that is required on the sync detector 11 which is time-based to an extent that it is undesirable to change the timing of the operation, uses the CLK33 circuit 15. In comparison, the MCLK 19 is used to operate the MCLK domain 13 can vary between 33 MHz to 60 MHz in an initial embodiment, whereas in that same embodiment, CLK33 operates at a fixed 33.8688 MHz. Likewise, the RD_CLK domain 12 can vary. Typical variations are from 26 to 52 MHz. In addition, the variable clocks 12 and 13 can be expected to have an increased upper range with increased rate speeds. Factors which may vary the RD_CLK include the format of the media being read, the format of the data on the media, and the speed at which the media is read. For example, a 2X DVD drive would have a correspondingly faster clock speed than a 1X DVD drive. In addition, sync detect must be able to track changes in read speed, for example, changes from 26 MHz to 52 MHz on the fly must be done in a gradual manner. In addition, a read channel can change the data acquisition rate. It is possible to vary the rate channel from one bit per clock to multiple bits per clock. This enables us to keep the clock rate on a motherboard at a lower rate of a high speed interface.

FIGS. 2A–D are a schematic block diagram showing details of the sync detect block of FIG. 1. Referring to FIG. 2, according to the present invention, a sync detect block 101 includes a reset circuit 102, a read channel deserializer 103, a sync compare circuit 104, a best sync candidate selection circuit 105, and a sync logic circuit 106. The sync logic circuit 106 includes an output bit counter 107 and a sector number counter 108. Also included in the sync detect block 101, is an input bit counter 109, a sync window generator 110, and an MCLK to read clock synchronizer 111, providing a signal to a D,E,F sector search circuit 112. The D,E,F sector search circuit 112 provides a signal to a sync control finite state machine (FSM) circuit 113, which in turn provides load signals to a sync sequence FSM circuit 114, which in turn provides signals to a sync jump FSM 115. The sync sequence FSM 114 and sync jump FSM 115 are connected to a sync type selector 116, which provides sync type output signals to the sync compare circuit 104. The sync type output signal is also provided to a read block to MCLK latch circuit 120, which includes a plurality of latch outputs from latches 121–129. A separate latch 131 is used to provide sync detect frame sync signals, and a read channel control circuit 134 provides sync detection sync enable signals and sync detection regulation signals.

FIGS. 3A and 3B are a table (Table 1) showing sync types according to the present invention. The figure shows sync patterns in accordance with sync type according to the present invention. As can be seen, each sync type is identifiable by particular sync patterns and error correction is achieved based on a presumed sync pattern. CD, CD-R and CD-RW formats use a standardized sync pattern as depicted in FIG. 4 (Table 2).

The physical sector format follows the sequence set forth in FIG. 5 (Table 3) according to the DVD standard. A sync search is initiated immediate after a seek is complete. As can be seen there is an ambiguity after the sequence of sync5, sync1, since that sequences places the sync pattern in either Row 1, sync5 or in Row 5, sync6. Therefore, three successive sync signals are required to resolve all ambiguities under the DVD standard.

Referring to FIGS. 3A and 3B, each sync resolves to one of four patterns, although the determination of the sync location according to a preferred embodiment of the invention is accomplished by a determination of the physical sector format. Within a block of 26 sync signals, each of a plurality of sync signals follows within a predetermined order. When searching for a sync pattern, we initially have no concept of which part of a bit stream is being read. For this reason, the read function may start randomly at any point in the bit stream. At this point, we don't know which sync we will encounter next. When the first sync comes in, there is comparison to see which sync is actually there. There are eight different sync patterns, with four variations. The comparison is effected by doing 32 different compares simultaneously. When the first sync signal is received, the comparison output is used to determine the best match of the 32. In the case of first receiving a sync signal, we are looking for an exact match with no errors accepted. At that point, we use a look-up table to determine which possible sequential sync signals may occur. Therefore, if we receive a sync 5, the next sync will have to be a 1, 2, 3 or 4. At this point, we do not know which of the sequence will be next. As a matter of arbitrary choice, the next sync type selector is set for sync 1, which is one of the possibilities. As the subsequent sync comes in, another compare is performed. This is done until a specific sync location is determined. Normally this occurs with two sync signals, but in the case of a sync 5 followed by a sync 1, an ambiguity exists. It is possible to have a sequence of 5-1-6 and 5-1-5. Therefore, it is necessary to wait for a third sync signal before determining the position within the 26 sync signals. In the present embodiment, this sequence of sync signals works for DVD's, but not for CD data. In CD data, there are sync patterns, but the syncs are all the same. Therefore, with the CD, once a sync is found, it is necessary to look at another location in the data area to determine where the start of the data sector is. While CD is mentioned, it is noted that the CD format can include CD-audio, CD-ROM, CD-W and CD-RW formats. In the present invention, we use data formats, such as those found on DVD discs, in which the sync data also contains information which can be used to indicate a location within a sector. Once the sync pattern is determined, it is possible to determine a sync 0, which provides information concerning the start of a frame. At that point, it is possible to expect that sequential sectors are read at regular intervals, with a sync pattern which corresponds to the data type. It turns out that, in the DVD standard, the sequence of sync 5, followed by sync 1 occurs twice in each frame. The ambiguity is resolved by a third sync pattern, which is either a 6 or a 5. Except for the 5-1 sequence, it is possible to determine a position within a sector by receiving two sync patterns, and in the case of the 5-2-1 sequence within three patterns. Therefore, according to the present invention, we establish the order of syncs.

Registers used for DVD configuration include memory locations for command and status, media control, sync status, and allowed sync errors for allowable sync errors during data acquisition. The allowable sync errors determines the tolerance of the DVD-DSP to the number of sync errors it allows before posting a sync lost flag in the data acquisition mode, and after the start of an ECC block has been found, the error tolerance must be reached. A programmed count of 0 to 127 represents a number of consecutive sync errors that can be tolerated without transition to a sync loss state in attempting to require sync. Further registers include sync sequence check bits. If data synchronization is lost, then the DVD-DSP will not attempt to reacquire synchronization automatically. This corresponds to a SYN 9820A standard and is provided for backward compatibility with the OTI-9820A sync detection operation. Buffer controls are also included in register information. The register also can be set to allow DVD data to be sent to memory. Three conditions must exist before data is actually transferred to memory:

1. DATACQ must be set to 1.
2. BUFSTRT must be set to 1.
3. The target ID (TID) must be detected if a TIDDIS flag is set to 0.

Buffered information includes sync detection window width, buffer control bits. A WINWIDTH signal controls the width of a sync window used in the sync detection module (101, FIG. 2). The sync pattern is normally expected in the read channel data stream every 1488 bits for DVD or 588 bits for CD. The 1488 bits consist of 1456 data bits other than sync bits, and 32 bits for sync code, or 24 bits for CD. This represents the center of the window. If there is a read channel disturbance caused by a defect in the reading of the media, this indicates that the read channel block and data is possibly misaligned. This causes the sync pattern to move relative to the previous sync. Therefore, it is possible to have more or less than 1488 bits between sync patterns. The window width controls how far the sync pattern can move from the expected 1488 bits without causing a sync error. Normally, WINWIDTH is left at its default setting of 32, which is the maximum width. This means that the sync pattern will be detected if it appears from 1456 bits (1488−32) to 1520 bits (1488+32) from the previous sync pattern. Possible values are 0 through 32. Therefore, this register is cleared to a decimal value of 32 by a power-on reset or by an RSTDSP signal.

Buffered read control bits are used to control the operation of the state machine in accordance with a preferred embodiment of the present invention. In addition, read control bits of a first type, are used prior to data acquisition. Read control is used to control the attempt to recover data synchronization. A register also holds read control bits subsequent to data acquisition. This register controls the number of repeated sync attempts that are made until data synchronization is achieved.

Figure 6:
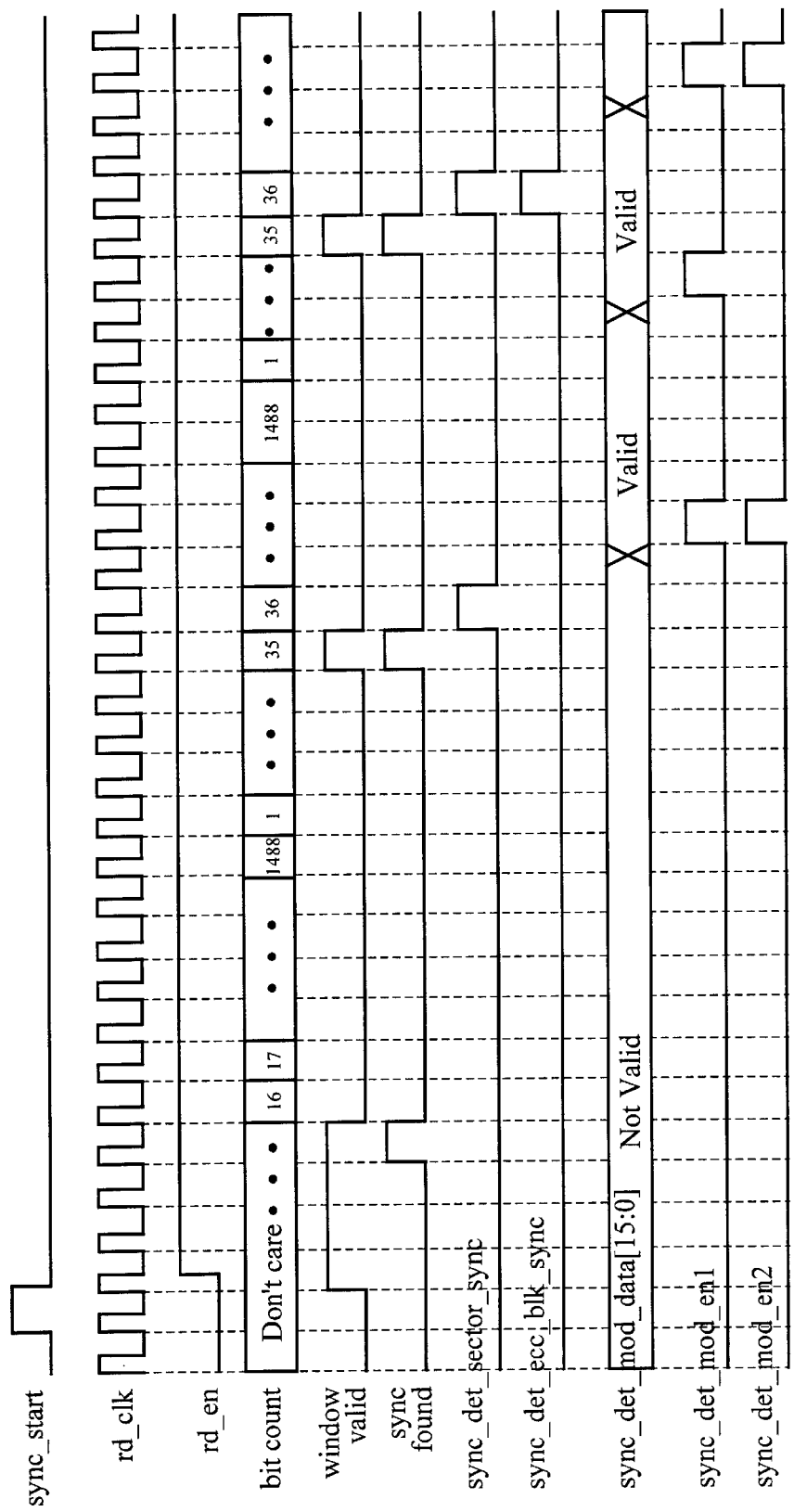
FIG. 6 is a timing diagram for sync detect operations in accordance with the present invention.

FIG. 6 is a timing diagram for sync detect operations in accordance with the present invention. The figure shows timing for a sync detection. This sync detection meets the timing criteria based on the bit count, then the sync detection remains in the state for detection by the first sync state engine. The pulses are read in order to establish the order of the syncs received. In order to decode data being read, it is necessary to know when the data starts. Therefore, finding the sync pattern and determining the downstream information requires these syncs. A difficulty occurs because when the data is being read, the sync can bounce completely outside of the time window for the sync. This can occur if we have a defect in the media or a defect in the transmission of data from the media. Normally, the sync locations are evenly spaced, but if the data is a little bit corrupted, the sync falls outside of the window. In the preferred embodiment for DVD, the sync rate is such that there are 1488 bits between sync pulses, center-to-center. This is, for example, one of the syncs is 1400 bits from the previous sync pulse, that shifts the sync pulse by 88 bits from the center. According to the preferred embodiment, the window width is ±32 bits, so that the 88 bits in the example is well beyond that ±32 bit window. If this sync pulse is occurring at 1400 bits, it is likely that sequential syncs will be 1488 bits from that sync pulse. Therefore, we make an assumption that the sync pulse is at the ±32 bit window. If the sequential sync pulses line up with the window, then the data is accepted in accordance with the sync pulse. In continuing to accept the train of syncs in the 1488 block sync pattern, the data is accepted based upon this assumption. If the pulses do not appear within the ±32 bit window, and the pulses do not self-correct, the data within the frames continues to appear erroneous. This continues because successive syncs do not fall within the ±32 bit window anticipated for 1488 bit sync pulses.

After a predetermined number of errors, a second state machine initiates a search for a new sync sequence. In order to reach this new series of sync pulses, it is necessary to first determine the first available sync for this new pulse train of syncs. Once we have found a new set of syncs, the distance of 1488 clocks per sync is reestablished. At the time, the second state machine is searching for a sync pattern. Therefore, data is lost during that time period. Once the new sync train is established, it is possible to use error correcting circuitry to correct for any errors which result from lost data.

By waiting for three successive syncs it is likely that a newly-acquired sync pattern is in fact the sync pattern generated by reading the media and not a false sync pattern. Therefore, in addition to the requirement for three successive sync pulses to avoid ambiguities in sector position, three successive sync pulses also avoid the possibility of reading random noise as a sync pattern.

Figure 7:
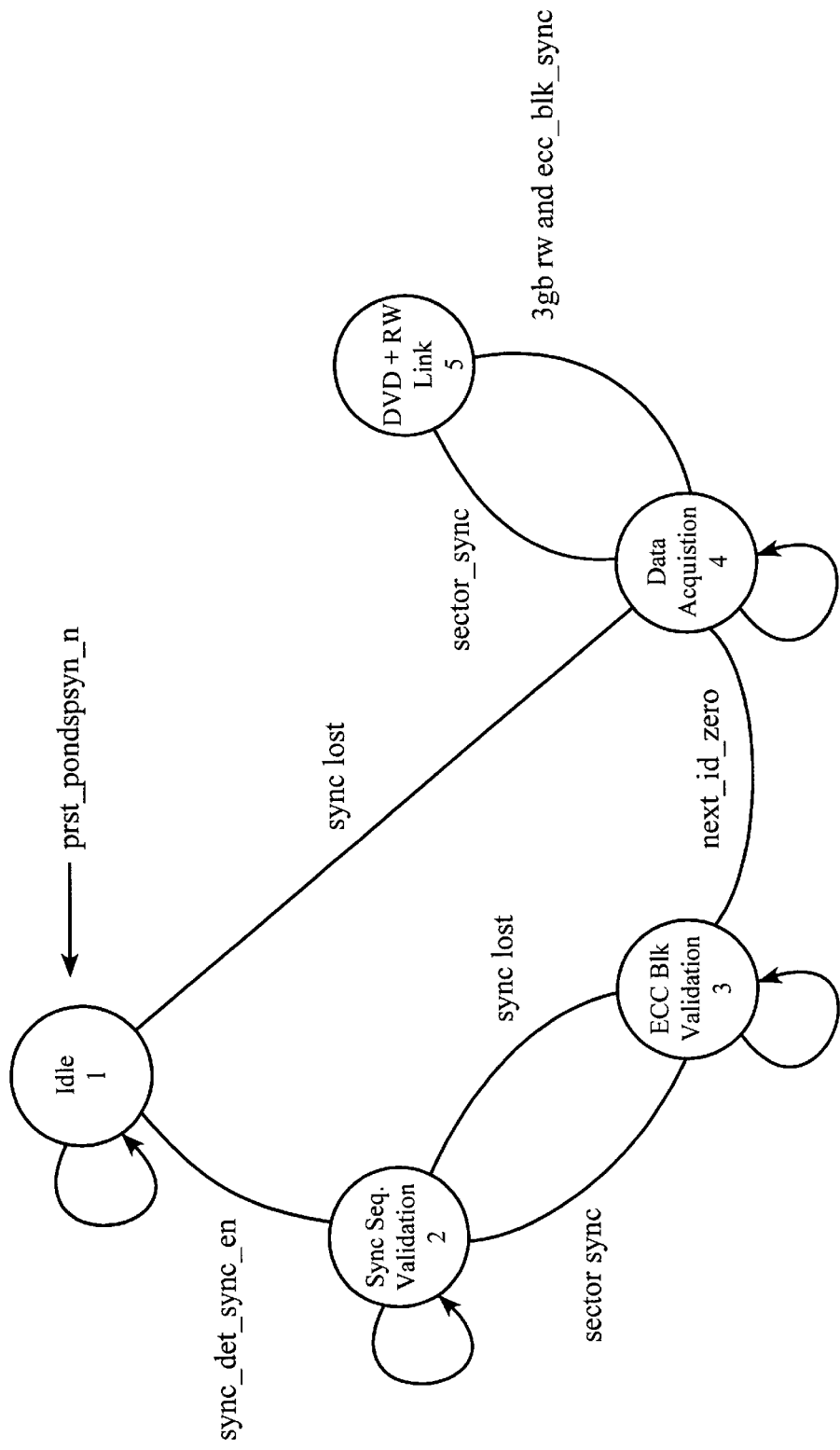
FIG. 7 is a state diagram showing sync control achieved by a sync control state machine in accordance with the present invention.

FIG. 7 is a state diagram showing the sequence of data acquisition and sync validation. Once sync is validated, an ECC block is validated and the next id is accepted as permitting data acquisition. If sync is lost, then a sync sequence validation is performed. The figure shows the use of sync error detection to provide a requirement to detect a new sync pattern.

Figure 8B:
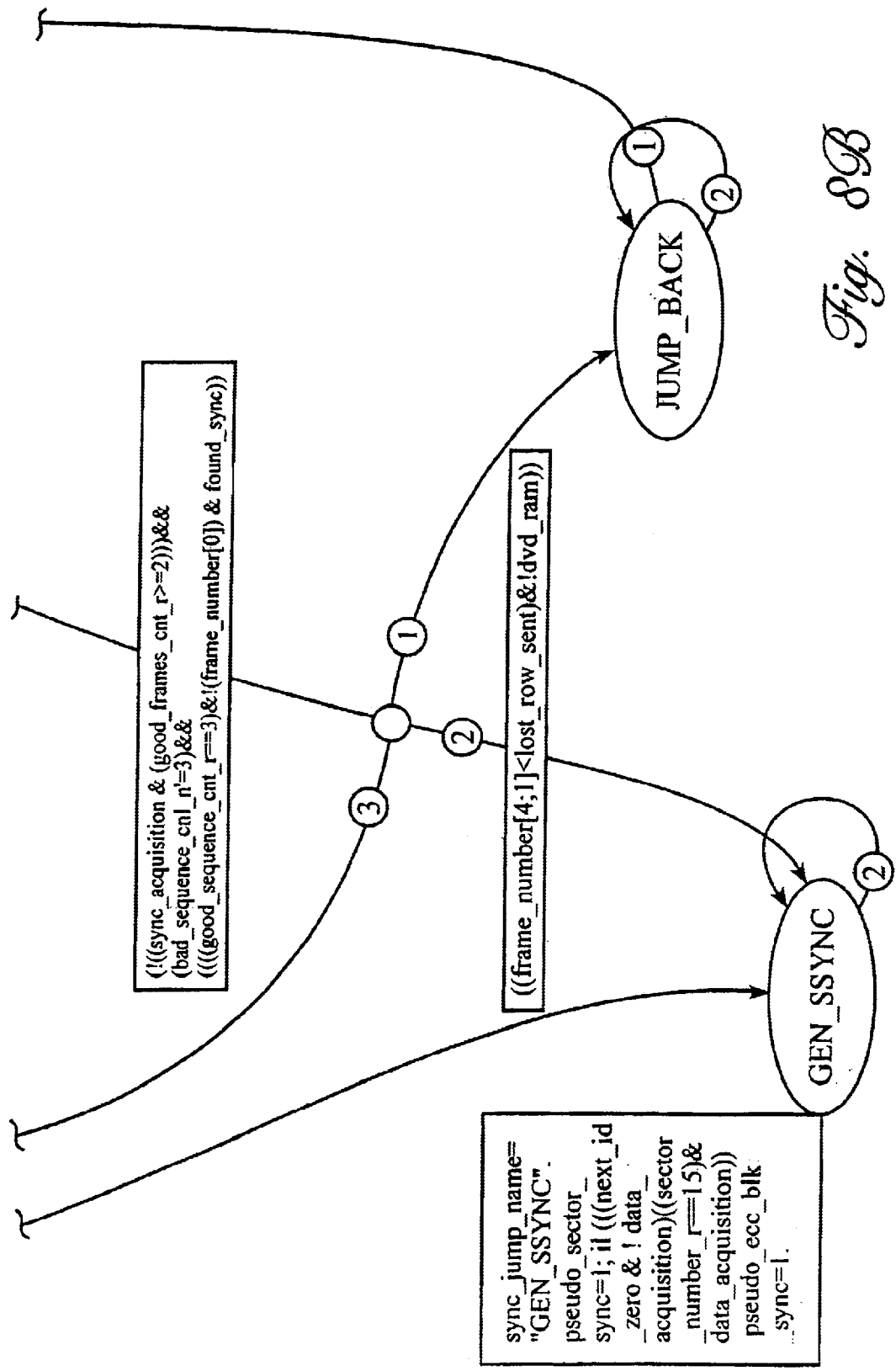
FIGS. 8A and B are a state diagram showing the selection of sync acquisition engines according to the present invention.

FIGS. 8A and B are a state diagram showing sync control achieved by a sync is control state machine in accordance with the present invention. The figure is a state diagram showing sync control of the state machine 599. The diagram shows changes in sync selection in accordance with the present invention. Referring to FIGS. 7, 8A and 8B, when a first state machine receives an erroneous sync train because syncs do not fall within the sync window, a "search" is commenced. During the search, a second state machine looks for sync patterns and determines the location of successive sync patterns within a definition of sync trains in a sector. If such a succession is found, then the new sync train is acquired and the second state machine moves the sync window. If the sync train is lost, then the first state machine proceeds to acquire a new sync train. During this change of sync windows, it is anticipated that about four syncs will be lost. ECC circuitry is used to correct such a loss of data. According to one embodiment of the present invention, up to 32 sync frames may be lost and ECC may still correct errors in the data. On a standard DVD disc, such loss of data would vary approximately equate a 6 mm scratch or black dot on the disc. Because of the ability to correct errors, it is possible to be conservative in both determining it's a sense of a sync error and establishing a new sync pattern. Therefore, it is not necessary to change state machines until it is certain that a sync train has been lost and a new sync train has been positively identified. As a practical matter, typical defects which cause a sync may remove several syncs. Therefore, while the error correcting window is 32, in a typical circumstance, there are fewer syncs available within which to acquire the new sync pattern and achieve error correction. Therefore, if the active state machine sees sync patterns at an even space of 1488, it continues to operate. If it no longer sees syncs, the syncs are out of the pattern within the sync window according to a preferred embodiment of the present invention. In the preferred embodiment, a 32-bit sync window is used. At that time, the second state machine, meaning the state machine which is not active, starts looking for the new sync pattern. A decision to jump forward or backwards in time is made based on the appearance of speeding up or slowing down when the second state machine acquires a new sync pattern. The clock itself is used to determine the rate the data is coming in. If the sync pattern shifts, the shift will be with respect to the data clock.

Once a new sync position is determined, it is possible to jump backward in time to the extent that data is buffered. If there is data stored in the buffer, it would be a simple matter of backing up to acquire the missing data. In the present configuration, it is not possible to back the pointer up in the buffer. Therefore, even though the new sync pattern is considered to have backed up in time, it is necessary to discard the data. Since error correction circuitry is used within a 32-bit window, it is possible to "clean up" everything afterward. In that way, the output of data is corrected and error-free.

Sync detection meets timing criteria based on the bit count, then the sync detection remains in the state for detection by the first sync state engine. The patterns are read in order to establish the order of the syncs received. In order to decode data being read, it is necessary to know when the data starts. Therefore, finding the sync pattern and determining the downstream information requires these syncs. A difficulty occurs because when the data is being read, the sync can bounce completely outside of the time window for the sync. This can occur if we have a defect in the media or a defect in the transmission of data from the media. Normally, the sync locations are evenly spaced, but if the data is a little bit corrupted, the sync falls outside of the window. In the preferred embodiment, the sync rate is such that there are 1488 bits between sync patterns, reference-to-reference. The reference may be the center, beginning or end of the sync window, or any other convenient location. If, for example, one of the syncs is 1400 bits from the previous sync pattern, that shifts the sync pattern by 88 bits from the reference. According to the preferred embodiment, the window within a sync pattern can be expected is 32 bits, so that the 88 bits in the example is well beyond that 32-bit window. If this sync pattern is occurring at 1400 bits, it is likely that sequential syncs will be 1488 bits from that sync pattern. Therefore, we make an assumption that the sync pattern is at the 1488 bit window. If the sequential sync patterns line up with the window, then the data is accepted in accordance with the sync pattern. In order to reach this new series of sync patterns, it is necessary to first determine the sync pattern for this new series of syncs. In continuing to accept the train of syncs in the 1488 block sync pattern, the data is accepted based upon this assumption. If the patterns do not appear within the 1488 window, and the patterns do not self-correct, the data within the frames continues to appear erroneous. This continues because successive syncs do not fall within the 32-bit window anticipated for 1488 bit sync patterns. After a predetermined number of errors, we therefore give up in trying to acquire the data and to start looking for syncs all over again. Once we have found a new set of syncs, the distance of 1488 clocks per sync is reestablished. At the time, the second state machine is searching for a sync pattern. Therefore, data is lost during that time period. Once the new sync train is established, it is possible to use error correcting circuitry to correct for any errors which result from lost data.

By waiting for three successive syncs, it is likely that a newly-acquired sync pattern is in fact the sync pattern generated by reading the media and not a false sync pattern. Therefore, in addition to the requirement for three successive sync patterns to avoid ambiguities in sector position, three successive sync patterns also avoid the possibility of reading random noise as a sync pattern.

What is claimed is:

1. A method for synchronizing a data read mechanism with frame units read by the data read mechanism, the method comprising:
   reading a datastream;
   selecting a sync pattern for detection;
   detecting a sync pattern sequence from the datastream with a first sync detection filter;
   establishing a window size during which a subsequent sync pattern would be detected should the selected sync pattern continue;
   after detecting the sync pattern sequence from the datastream, attempting to detect the subsequent sync pattern;
   if detection of the subsequent sync pattern fails a predetermined number of sequential times, using a second sync detection filter to detect a new sync pattern;
   if one of the first and second sync detection filters detects a sync pattern, using said one of the first and second sync detection filters to attempt to detect subsequent sync patterns; and
   if detection of the subsequent sync pattern fails the predetermined number of sequential times, using the other one of the first and second sync detection filters to detect a subsequent new sync pattern.

2. Method as described in claim 1, wherein the sync pattern includes a logical sequence of sync patterns in accordance with a defined standard, such that a plurality of sync patterns within a frame are separately identifiable and a series of at least two of said sync patterns provides a unique identification of a position of the sync patterns within the frame, and no more than four sequential patterns are required for said unique identification.

3. Method as described in claim 1, wherein failure of detection of subsequent sync patterns includes failure to detect a sync pattern within a predefined window of variation from a predetermined number of data bits.

4. Method as described in claim 1, wherein the datastream is read from a communications channel.

5. Method as described in claim 1, wherein the datastream is read from digital storage media.

6. Method as described in claim 1, wherein:
   the sync pattern includes a logical sequence of sync patterns in accordance with a defined disc media standard; and
   failure of detection of subsequent sync patterns includes failure to detect a sync pattern within a predefined window of variation from 1488 data bits.

7. Method as described in claim 6, wherein the 1488 data bits consist of 1456 bits other than sync bits, and 32 bits for sync code.

8. Method as described in claim 1, wherein uniquely definable sequences of sync patterns are used to determine a position of sync patterns within a sector of data.

9. Method as described in claim 1, wherein:
   the sync pattern includes a logical sequence of sync patterns in accordance with a defined disc media standard;
   in a first mode of operation, failure of detection of subsequent sync patterns includes failure to detect a sync pattern within a predefined window of variation from 1488 data bits; and
   in a second mode of operation, failure of detection of subsequent sync patterns includes failure to detect a sync pattern within a predefined window of variation from 588 data bits.

10. Apparatus for synchronizing a data read mechanism with frame units read by the data read mechanism, the apparatus comprising:
    an input receiving a datastream for reading;
    circuitry for selecting a sync pattern for detection;
    first and second sync detection filters for detecting a sync pattern sequence from the datastream, using a window size during which a subsequent sync pattern would be detected should the selected sync pattern continue, and after detecting the sync pattern sequence from the datastream, attempting to detect the subsequent sync pattern; and
    a selection circuit responding to a predetermined failure of detection of the subsequent sync pattern fails a predetermined number of sequential times, the selection circuit alternately using the first and second sync detection filters in order to detect a new sync pattern, wherein if one of the first and second sync detection filters detects a sync pattern, using said one of the first and second sync detection filters to attempt to detect subsequent sync patterns, and if detection of the subsequent sync pattern fails the predetermined number of sequential times, using the other one of the first and second sync detection filters to detect a subsequent new sync pattern.

11. Apparatus as described in claim 10, wherein the first and second sync detection filters are capable of detecting a sync pattern which includes a logical sequence of sync patterns in accordance with a defined standard, such that a plurality of sync patterns within a frame are separately identifiable and a series of at least two of said sync patterns provides a unique identification of a position of the sync patterns within the frame, and no more than four sequential patterns are required for said unique identification.

12. Apparatus as described in claim 10, wherein the selection circuit responds to a failure of detection of subsequent sync patterns including a failure to detect a sync pattern within a predefined window of variation from a predetermined number of data bits.

13. Apparatus as described in claim 10, wherein the datastream is read from a communications channel.

14. Apparatus as described in claim 10, wherein the datastream is read from digital storage media.

15. Apparatus as described in claim 10, wherein:
    the sync pattern includes a logical sequence of sync patterns in accordance with a defined disc media standard; and
    the selection circuit responds to a failure of detection of subsequent sync patterns including a failure to detect a sync pattern within a predefined window of variation from 1488 data bits.

16. Apparatus as described in claim 15, wherein the 1488 data bits consist of 1456 bits other than sync bits, and 32 bits for sync code.

17. Apparatus as described in claim 10, wherein uniquely definable sequences of sync patterns are used to determine a position of sync patterns within a sector of data.

18. Apparatus for synchronizing a data read mechanism with frame units read by the data read mechanism, the apparatus comprising:

a sync detect logic circuit comprising circuitry for tracking a sync pattern in a bitstream of data read by the data read mechanism, comprising a state machine and logic to handle sync detection when at least one large jump or gap is present in the data stream, and providing a sync output signal in response to the tracked sync pattern;

an additional sync detect logic circuit capable of sync detection, the additional logic circuit detecting the sync pattern when the sync detect logic circuit fails to track said sync pattern, and providing a sync output signal in response to the tracked sync pattern; and a master state machine to select which of the logic circuits is used to provide a sync output signal.

19. Apparatus as described in claim 18, wherein:

the sync pattern includes a logical sequence of sync patterns in accordance with a defined disc media standard.

20. Apparatus as described in claim 18, wherein said master state machine, controls said sync detect logic circuits to cause controls said sync detect logic circuit to perform an initial search for sync patterns and sync sequences and to maintain synchronization when a sync pattern has been established.

21. Apparatus as described in claim 18, wherein the master state machine responds to a failure to detect subsequent sync patterns including a failure to detect a sync pattern within a predefined window of variation from a predetermined number of data bits.

22. Apparatus as described in claim 18, wherein:

said sync pattern includes a logical sequence of sync patterns in accordance with a defined disc media standard; and said master state machine responds to a failure of detection of subsequent sync patterns including a failure to detect a sync pattern within a predefined window of variation from 1488 data bits.

23. Apparatus as described in claim 22, wherein said 1488 data bits consist of 1456 bits other than sync bits, and 32 bits for sync code.

24. Apparatus as described in claim 18, wherein at least one uniquely definable sequence of sync patterns is used to determine a position of sync patterns within a sector of data.

25. Apparatus as described in claim 18, wherein:

said sync pattern includes a logical sequence of sync patterns in accordance with a defined disc media standard;

in a first mode of operation, failure to detect subsequent sync patterns includes failure to detect a sync pattern within a predefined window of variation from 1488 data bits; and in a second mode of operation, failure to detect subsequent sync patterns includes failure to detect a sync pattern within a predefined window of variation from 588 data bits.

26. A method for synchronizing a data read mechanism with frame units read by the data read mechanism, the method comprising:

providing a requirement for a sync jump comprising a process of failure to detect a sync pattern within a predefined window of variation from a predetermined number of data bits;

using a state machine to detect a new sync pattern when the sync jump is required;

determining which direction to effect a sync jump; and effecting the sync jump.

27. Method as described in claim 26, wherein the sync pattern includes a logical sequence of sync patterns in accordance with a defined standard, such that a plurality of sync patterns within a frame are separately identifiable and a series of at least two of said sync patterns provides a unique identification of a position of said sync patterns within the frame, and no more than four sequential patterns are required for said unique identification.

28. Method as described in claim 26, wherein said data stream is read from a communications channel.

29. Method as described in claim 26, wherein said data stream is read from digital storage media.

30. Method as described in claim 26, wherein said sync jump is recognized when failure of detection of subsequent sync patterns includes failure to detect a sync pattern within a predefined window of variation from 1488 data bits.

31. Method as described in claim 30, wherein said 1488 data bits consist of 1456 bits other than sync bits, and 32 bits for sync code.

32. Method as described in claim 26, wherein:

said sync pattern includes a logical sequence of sync patterns in accordance with a defined disc media standard;

in a first mode of operation, failure of detection of subsequent sync patterns includes failure to detect a sync pattern within a predefined window of variation from 1488 data bits; and in a second mode of operation, failure of detection of subsequent sync patterns includes failure to detect a sync pattern within a predefined window of variation from 588 data bits.

33. Method as described in claim 26, wherein at least one uniquely definable sequence of sync patterns is used to determine a position of sync patterns within a sector of data.

34. Method as described in claim 26, wherein said direction of said sync jump is made by determining a direction which results in a smallest jump.

35. Method as described in claim 26, wherein said direction of said sync jump is made by comparing a sync pattern anticipated by an internal time base with a new sync pattern in order to determine a closest approximation of the new sync pattern to the internal time base.

36. Method as described in claim 35, wherein:

when said sync jump is effected in a forward direction, said new sync pattern is adopted; and when said sync jump is determined to be performed as a backward jump, a pointer is moved to match said new sync pattern.

37. Method as described in claim 35, wherein:

when said sync jump is effected in a forward direction, said new sync pattern is adopted; and when said sync jump is determined to be performed as a backwards jump, data read functions are delayed.

38. Method as described in claim 26, wherein:

said sync pattern includes a logical sequence of sync patterns in accordance with a defined disc media standard; and said direction of the jump is determined by a process comprising comparing a sync pattern anticipated by an internal time base with a new sync pattern in order to determine a closest approximation of the new sync pattern to the internal time base.

39. Method as described in claim 32, wherein:

said direction of said sync jump is made by comparing a sync pattern anticipated by an internal time base with a new sync pattern in order to determine a closest approximation of the new sync pattern to the internal time base;

when said sync jump is effected in a forward direction, the new sync pattern is adopted; and when said sync jump is determined to be performed as a backward jump, a pointer is moved to match the new sync pattern.

40. Method as described in claim 33, wherein:

said direction of said sync is determined by a process compromise comparing a sync pattern anticipated by an internal time base with a new sync pattern in order to determine a closest approximation of the new sync pattern to the internal base;

said sync jump is effected in a forward direction, the new sync pattern is adopted; and said sync jump is determined to be performed as a backward jump, data read functions are delayed.

* * * * *

UNITED STATES PATENT AND TRADEMARK OFFICE
CERTIFICATE OF CORRECTION

PATENT NO.   : 6,788,753 B1  Page 1 of 1
DATED        : September 7, 2004
INVENTOR(S)  : Christopher T. Brown It is certified that error appears in the above-identified patent and that said Letters Patent is hereby corrected as shown below:

Title page,
Item [57], ABSTRACT,
Line 1, after "other", delete "dada" and insert -- data --.

Column 7,
Line 46, after "sync" and before "control", delete "is".

Column 14,
Line 5, after "claim" and before "wherein", delete "33," and insert -- 32, --.
Line 6, after "sync" and before "is", insert -- jump --.
Line 7, before "comparing", delete "compromise" and insert -- comprising --.

Signed and Sealed this

Twenty-eighth Day of December, 2004

JON W. DUDAS
*Director of the United States Patent and Trademark Office*